US010701174B2

(12) United States Patent
Biron et al.

(10) Patent No.: US 10,701,174 B2
(45) Date of Patent: Jun. 30, 2020

(54) RESOURCE REQUESTS

(71) Applicant: ENTIT SOFTWARE LLC, Sanford, NC (US)

(72) Inventors: Ran Biron, Yehud (IL); Lior Ben Zeev, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 3 days.

(21) Appl. No.: 16/067,739

(22) PCT Filed: Jan. 5, 2016

(86) PCT No.: PCT/US2016/012139
§ 371 (c)(1),
(2) Date: Jul. 2, 2018

(87) PCT Pub. No.: WO2017/119869
PCT Pub. Date: Jul. 13, 2017

(65) Prior Publication Data
US 2019/0007516 A1    Jan. 3, 2019

(51) Int. Cl.
*H04L 29/08* (2006.01)
*H04L 29/06* (2006.01)
*H04L 12/911* (2013.01)

(52) U.S. Cl.
CPC .......... *H04L 67/2852* (2013.01); *H04L 67/32* (2013.01); *H04L 67/42* (2013.01); *H04L 47/821* (2013.01)

(58) Field of Classification Search
CPC ...... H04L 67/32; H04L 67/42; H04L 67/2852
(Continued)

(56) References Cited

U.S. PATENT DOCUMENTS

2004/0068579 A1* 4/2004 Marmigere ............. H04L 29/06
709/242
2008/0049620 A1* 2/2008 Riga ...................... G01D 9/005
370/236
(Continued)

FOREIGN PATENT DOCUMENTS

JP      1165905 A    3/1999
JP   2002189618 A    7/2002
(Continued)

OTHER PUBLICATIONS

International Search Report & Written Opinion received in PCT Application No. PCT/US2016/012139, dated Sep. 22, 2016, 12 pages.
(Continued)

*Primary Examiner* — James E Springer

(57) ABSTRACT

Examples disclosed herein relate, among other things, to a first computing device including a server optimization module communicatively coupled to a server application. The server optimization module may receive, from a second computing device, a resource request identifying a resource, and send to the second computing device a packet list identifying a set of packets associated with the resource, where each packet describes differences between different versions of the resource. The server optimization module may also receive from the second computing device a set of packet requests, each packet request identifying a packet from the set of packets, and for each packet in the set of packets, send the packet to the second computing device based on a determination that the packet has been updated since the packet has been last sent to the second computing device.

20 Claims, 10 Drawing Sheets

(58) Field of Classification Search
USPC .......................................................... 709/213
See application file for complete search history.

(56) References Cited

U.S. PATENT DOCUMENTS

| | | | |
|---|---|---|---|
| 2010/0235321 A1* | 9/2010 | Shukla | H04L 67/10 707/610 |
| 2011/0029641 A1* | 2/2011 | Fainberg | G06F 12/0862 709/219 |
| 2011/0058490 A1* | 3/2011 | Mills | H04L 12/1886 370/252 |
| 2014/0052772 A1 | 2/2014 | Hourselt et al. | |
| 2014/0235351 A1 | 8/2014 | Takushima | |
| 2015/0234647 A1* | 8/2015 | Lai | H04L 67/10 717/169 |
| 2016/0191645 A1* | 6/2016 | Hayton | G06F 9/445 709/203 |
| 2016/0334239 A1* | 11/2016 | Cho | G09B 29/106 |

FOREIGN PATENT DOCUMENTS

| | | |
|---|---|---|
| KR | 20060070143 A | 6/2006 |
| KR | 20100048469 A | 5/2010 |

OTHER PUBLICATIONS

Wikipedia, diff utility dated on or before Dec. 23, 2015 (11 pages).

* cited by examiner

RESOURCE REQUESTS

BACKGROUND

Many applications today are developed in a client-server fashion, where client applications running on client devices may communicate through a network (e.g., the Internet) with a server application running on a server. In many applications, the server may store various resources that may be provided to the client applications upon request. Some resources (e.g., images, static webpages, etc.) may be static and may not change or change very rarely. For such resources, various caching or proxy mechanisms exist where a cache or a proxy may store a "local" copy of the resource and provide it to the client application upon request without retrieving the resource from the server, thereby increasing the application's responsiveness, and reducing the load on the server and on the network.

BRIEF DESCRIPTION OF THE DRAWINGS

The following detailed description references the drawings, wherein.

DETAILED DESCRIPTION

As mentioned above, caching and proxy mechanism may optimize the client's retrieval of static resources stored on the server. Such mechanism may not be efficient, however, for dynamic resources that frequently change, such as a table containing frequently updated data. A cached copy of a dynamic resource may quickly become outdated. This may result in frequent updates of the cache, each update causing the entire resource to be downloaded from the server, even if the resource has changed incrementally, e.g., if a small number of entries have been added to, removed from, or changed in a data table.

Examples disclosed herein describe, among other things, a first computing device including a server optimization module communicatively coupled to a server application. The server optimization module may receive, from a second computing device, a resource request identifying a resource, and send to the second computing device a packet list identifying a set of packets associated with the resource, where each packet describes differences between different versions of the resource. That is, a first packet may describe difference between the first version of the resource and the null (empty) version of the resources, the second packet may describe differences between the second version and the first version, and so forth. The server optimization module may also receive from the second computing device a set of packet requests, each packet request identifying a packet from the set of packets, and for each packet in the set of packets, send the packet to the second computing device based on a determination that the packet has been updated since the packet has been last sent to the second computing device.

Thus, the client application may obtain the updated version of the resource by downloading a portion of the resource from the server. By avoiding a download of the entire resource, the resource may be delivered to the client application faster, and the load of the network, the server's processor, and the server's memory may be reduced, which may also reduce the server's power consumption.

Figure 1:
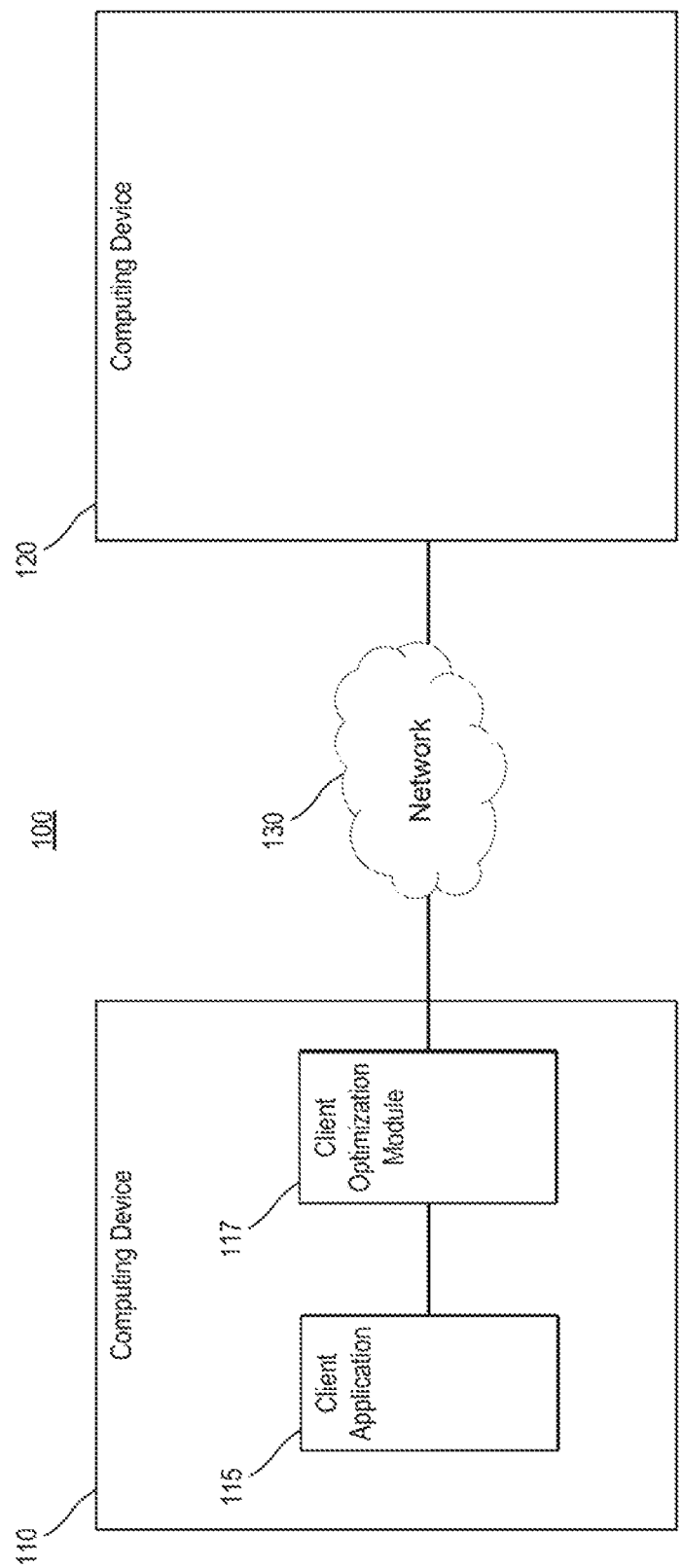
FIG. 1 is a block diagram of an example system.

FIG. 1 is a block diagram of an example system 100 that includes computing device 110 and computing device 120 communicating with each other via network 130. Computing device 110 and computing device 120 may each include any type of electronic device or any combination of electronic devices capable of performing the functionality discussed herein. For example, any of computing devices 110 or 120 may be any of the following electronic devices: a desktop computer, a laptop computer, a tablet computer, a server computer, smartphone, an application-specific computing device, or any other processing device or equipment. Network 130 may include any number of wireless and wired networks, wide-area networks such as the Internet, local-area networks, and so forth.

As illustrated in FIG. 1, computing device 110 may include a client application 115 and a client optimization module 117, each of which may be implemented as any combination of hardware and instructions (e.g., programming), as will be further discussed below. In some examples, client application 115 may be a web browser, or any other desktop or mobile application used by a user to access the Internet. In some examples, client optimization module 117 may be implemented as an extension or as an add-on to client application 115, or as any other type of module communicatively coupled to client application 115. Client optimization module 117 and client application 115 may be implemented as separate modules communicatively coupled to each other, or as a single integrated module. Furthermore, while in the example of FIG. 1 client optimization module 117 and client application 115 are depicted as part of the same computing device 110, in other examples, client optimization module 117 or client application 115 may not be a part of computing device 110. For example, client application 115 may be included in computing device 110, while client optimization module 117 may be included in another computing device (not shown for brevity), such as a proxy server, where the other computing device is communicatively coupled to computing device 110.

In some examples, client application 115 may communicate with computing device 120. For example, client application 115 may communicate with computing device 120 using a particular protocol, such as Hypertext Transfer Protocol (HTTP), File Transfer Protocol (FTP), or any other type of protocol. In some examples, client optimization module 117 may obtain all or at least some of the communications sent by client application 115 to computing device 120 and communications received by client application 115 from computing device 120. For example, an operating system running on computing device 110 may pass to client optimization module 117 all or some types of communications sent and received by client application 115. In some examples, as will be discussed below, client optimization module 117 may process and analyze the obtained communications. Based on the analysis, optimization module 117 may forward some of the communications to their destinations unchanged, block some communications, i.e., preventing them from reaching their destination, modify some communications before forwarding them to the original destination, generate and send new communications, and otherwise manipulate the communications, as discussed below.

Figure 2:
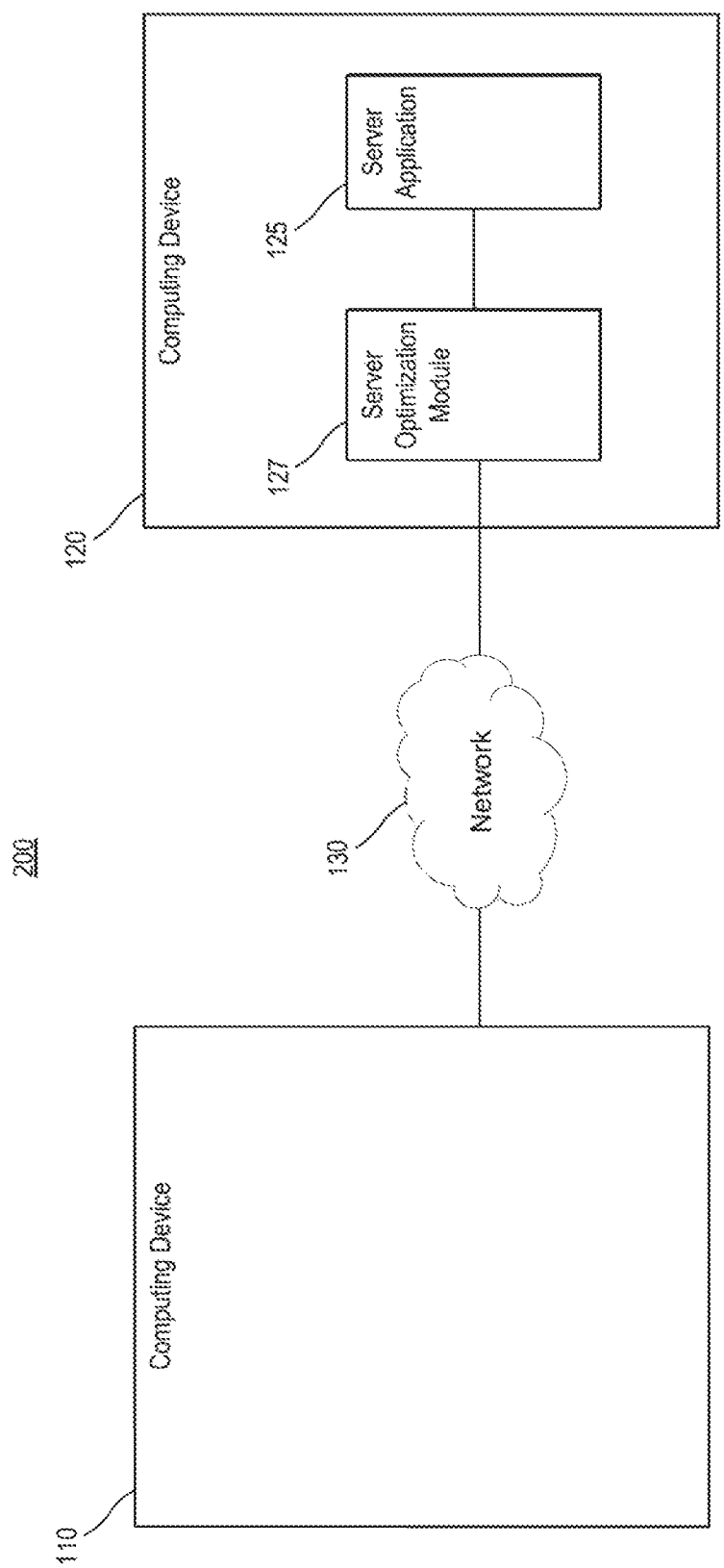
FIG. 2 is another block diagram of an example system.

FIG. 2 is a block diagram of an example system 200 which also includes computing device 110 communicatively coupled to computing device 120 via network 130. In the example of FIG. 2, computing device 120 includes a server optimization module and a server application 125, each of which may be implemented as any combination of hardware and instructions (e.g., programming), as will be further discussed below. In some examples, server application 125 may be a web server application such as an HTTP server application (e.g., Apache, Internet Information Services (IIS), etc.) or any other type of application capable of communicating with client application 115 over any type of protocol.

In some examples, server optimization module 127 may be implemented as an extension or an add-on to server application 125, or as any other type of module communicatively coupled to server application 125. Server optimization module 127 and server application 125 may be implemented as separate modules communicatively coupled to each other, or as a single integrated module. Furthermore, while in the example of FIG. 2 server optimization module 127 and server application 125 are depicted as part of the same computing device 120, in other examples, server optimization module 127 or server application 125 may not be a part of computing device 120. For example, server application 125 may be included in computing device 120, while server optimization module 127 may be included in another computing device (not shown for brevity), such as a proxy server, where the other computing device is communicatively coupled to computing device 120.

In some examples, server application 125 may communicate with computing device 110. For example, server application 125 may communicate with computing device 110 using a particular protocol, such as Hypertext Transfer Protocol (HTTP). File Transfer Protocol (FTP), or any other type of protocol. In some examples, server optimization module 127 may obtain all or at least some of the communications sent by server application 125 to computing device 110 and communications received by server application 125 from computing device 110. For example, an operating system running on computing device 120 may pass to server optimization module 127 all or some types of communications sent and received by server application 125. In some examples, as will be discussed below, server optimization module 127 may process and analyze the obtained communications. Based on the analysis, server optimization module 127 may forward some of the communications to their destinations unchanged, block some communications. i.e., preventing them from reaching their destination, modify some communications before forwarding them to the original destination, generate and send new communications, and otherwise manipulate the communications, as discussed below.

Figure 3:
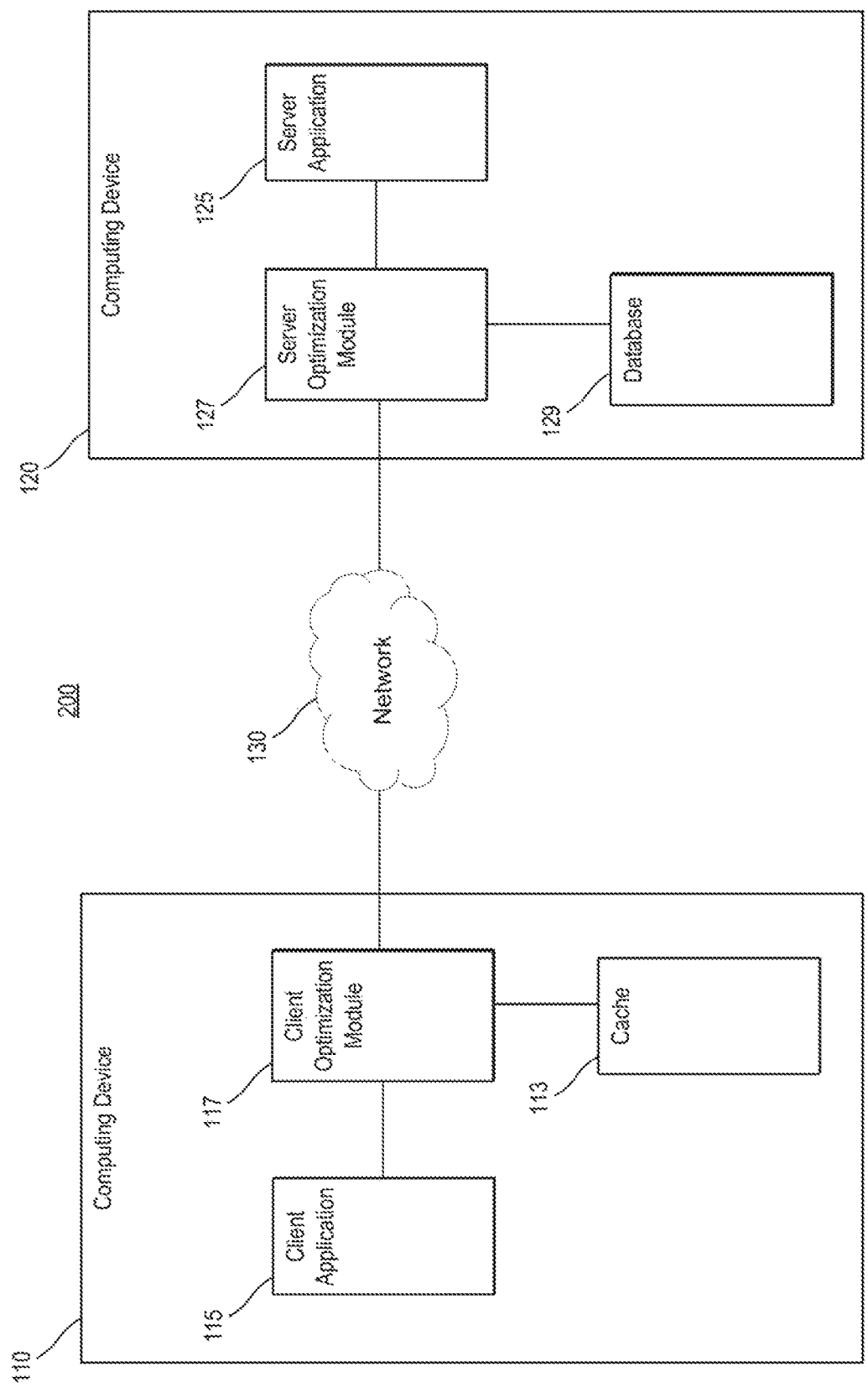
FIG. 3 is yet another block diagram of an example system.

FIG. 3 is a block diagram of an example system 300 which also includes computing device 110 communicatively coupled to computing device 120 via network 130. In the example of FIG. 3, computing device 110 includes, in addition to client application 115 and client optimization module 117, a cache 113. Cache 113 may be implemented as any type of cache. Cache 113 may be integrated with or communicatively coupled to client application 115. For example, if client application 115 is a web browser, cache 113 may be the web browser's cache. In some examples, all or at least some communications between cache 113 and client optimization module 117 may be passed through client optimization module 117, which can block some communications, modify some communications, pass some communications unchanged, or generate new communications, as will be discussed below. As illustrated in the example of FIG. 3, computing device 120 may also include a database 129, which may be any type of database (e.g., MySQL) coupled to any type of volatile or non-volatile memory, such as a random-access memory (RAM), flash memory, hard drive, memristor-based memory, and so forth. In some examples, database 129 may not be included in computing device 120, and may reside on another computing device that is communicatively coupled to computing device 120.

Computing devices 110 and 120 may include various additional components, such as processors, network interface cards, etc., not shown in FIG. 3 for brevity. It is also appreciated that while for brevity purposes examples discussed herein describe a single computing device 120 communicating with a single computing device 110, in some examples a single computing device 120 may concurrently communicate in a similar fashion with any number of computing devices 110, and vice versa.

FIGS. 4-8 show example sequences of communications between the various modules discussed above, illustrating some of the methods and techniques disclosed herein. These examples are provided for illustration purposes, and are not to be considered limiting in any way. For instance, while the example sequences illustrated in the examples of FIGS. 4-8 show HTTP communications, the methods and systems described herein can also be applied to various other communication protocols and standards. Also, while the examples illustrate some communications being performed sequentially and in a particular order, in other implementations, some communications may be performed substantially concurrently or in a different order. Furthermore, a communication being described in some examples as a single communication may be implemented using multiple communications in other implementations, and vice versa.

Figure 4:
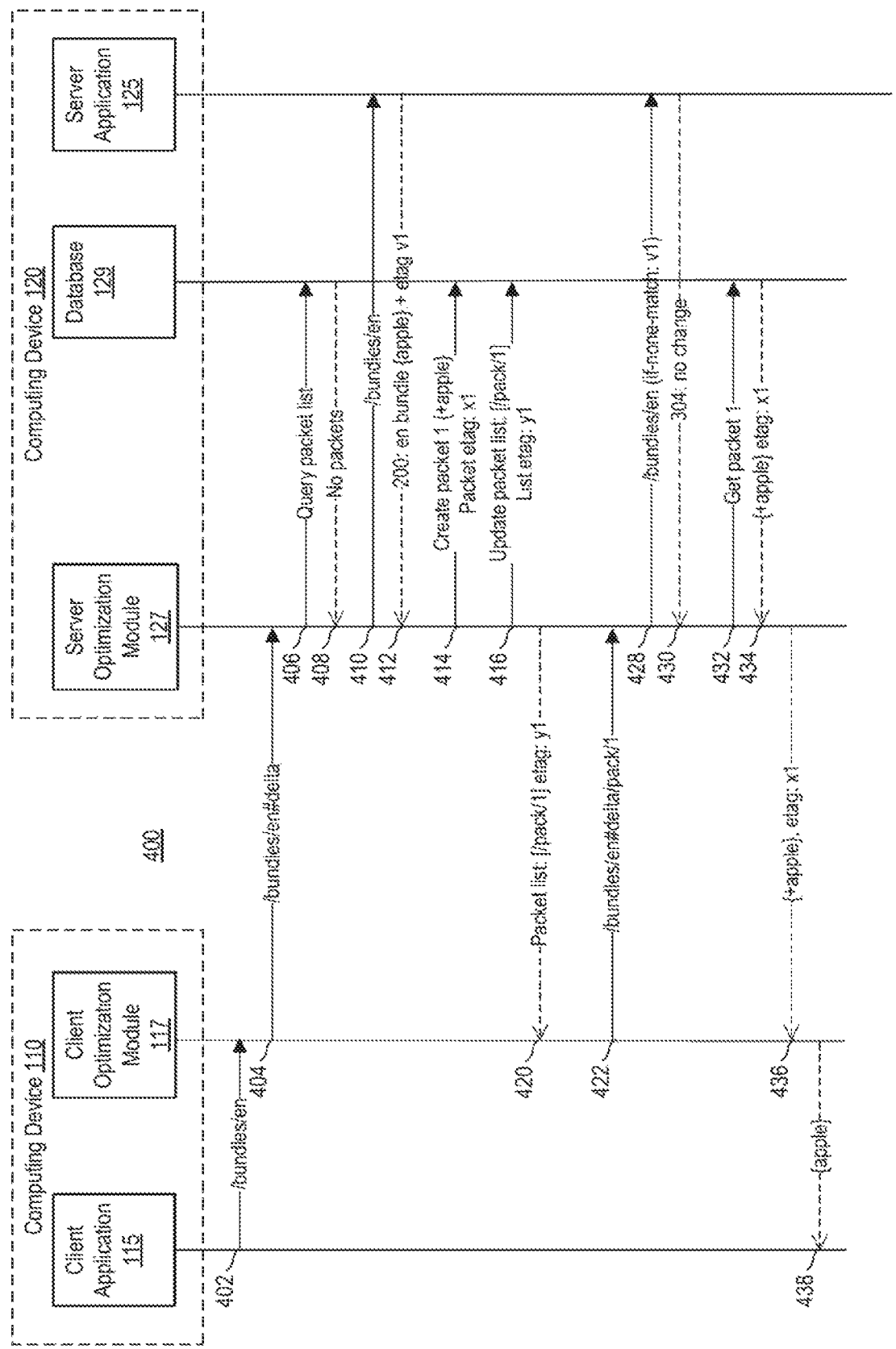
FIG. 4 illustrates an example sequence of communications.

FIG. 4 illustrates an example sequence 400. Sequence 400 begins with client application 115 issuing a resource request 402 identifying a particular resource to be downloaded. For example, client application 115 may be a web browser or a mobile or desktop application, which may request that a resource (e.g., a webpage, an image, a video clip, a data table, etc.) be downloaded from a remote device. In the example of FIG. 4, client application 115 requests a resource identified as "bundles/en" from computing device 120 using, for example, an HTTP GET request.

After client application 115 issues resource request 402, the request is obtained by client optimization module 117, which, as discussed above, may automatically intercept (or otherwise obtain) all or at least some requests issued by client application 115. In some examples, upon obtaining resource request 402 from client application 115, client optimization module 117 may forward resource request 402 to computing device 120 without modifying it. In other examples, as illustrated in FIG. 4, client optimization module 117 may first modify resource request 402 to produce a modified resource request 404 (or generate modified resource request 404 based on resource request 402). In the example of FIG. 4, client optimization module 117 modifies the original resource request 402 by adding to it a predefined indicator indicating that the requester of the resource supports a packet-based type of download, as discussed below. Specifically, in the example of FIG. 4, client optimization module 117 includes in modified resource request 404 a predefined fragment identifier "#delta." The predefined fragment identifier may be recognized by the receiving module (e.g., server optimization module 127), or not recognized by the receiving module (e.g., if server optimization module 127 is not included or not coupled to computing device 120) in which case it may be ignored, thereby providing backward compatibility. In other implementations, other types of indicators indicating packet-based download support may be included in modified resource request 404. Also, as mentioned above, in some implementations, client optimization module 117 may forward to computing device 120 resource request 402 without modifying it. In those examples, it may either be assumed by server optimization module 127 that computing device 110 supports packet-based download, or client optimization module 117 may and indicate the packet-based download support via separate communication(s) preceding or following resource request 402.

After modified resource request 404 (or unmodified resource request 402, as discussed above) is sent by client optimization module 117 to computing device 120, modified resource request 404 is intercepted by server optimization module 127. In some examples, server optimization module 127 may determine, based on modified resource request 404, whether the requester (e.g., computing device 110) supports packet-based download of the resource. As discussed above, this determination may be made, for example, based on a detection within modified resource request of a predefined indicator (e.g., predefined fragment "#delta") or based on other communications, settings, or assumptions. If module 127 determines that the requester does not support packet-based download of the resource, it may obtain the entire resource, and send the entire resource to the requester in a backward-compatible manner. In the example of FIG. 4, however, module 127 determines that the requester supports packet-based download of the resource based on a determination that the request includes the predefined fragment.

After receiving the request and determining that the requester supports packet-based download of the resource, module 127 may obtain from database 129 a packet list associated with the resource. In some examples, the packet list may identify a set of packets that collectively describe the resource, i.e., a set of packets based on which the entire contents of the resource can be determined. In some examples, the packet list is an ordered list of packets, where each packet describes a different version of the resource. Thus, a first packet may describe one version of the resource; the second packet may describe another (m) version of the resource, and so forth until the last packet describing the latest (most recent) version of the resource. The term "version" as used herein is not limited to versions manually assigned to the resource by the user (e.g., 1.0, 1.1, etc.) but refers to any modification of the resource. The term "version" as used herein is not limited to versions manually assigned to the resource by the user (e.g., 1.0, 1.1, etc.) but refers to the contents of the resource at a given point in time. Thus, any modification of the resource's contents may be considered as a change of the resource's version for the purpose of the examples described herein. More specifically, in some examples, each packet may describe the differences between two different versions of the resource, i.e., between the version associated with the packet and the previous version associated with the previous packet. In other words, the first packet may describe the differences between the first version of the packet and the null version of the resource (the null version having no contents); the second packet may describe the differences between the second version of the packet and the first version of the resource; the third packet may describe the differences between the third version of the packet and the second version of the resource; and so forth. Each packet may describe the differences between its version and the previous version using any suitable standard or convention. For example, each packet may describe a set of bytes (e.g., characters, words, lines, etc.) that were added to the previous version and/or a set of bytes that were removed from the previous version. Accordingly, by applying the differences described in the second packet to the differences described in the first packet, then applying the differences described in the third packet to the result obtained at the previous operation, and so on, recursively, the contents of the latest version of the resource can be determined. As used herein, the term "differences," despite its plural form, may also refer to a single (e.g., one-byte) difference.

In some examples, the packet list identifying the set of packets and the packets themselves can be stored in database 129 and maintained by server optimization module 127. In other examples, the packet list and the packets may be stored in different memories and/or maintained by other modules. In the example of FIG. 4, in order to obtain the packet list, module 127 may queries (406) database 129 for the packet list and receives a response (408) that the list is empty and has not been created. This may mean, for example, that neither computing device 110 nor other computing devices have previously requested the particular resource.

After determining that the packet list is empty or has not been created, server optimization module 127 may generate the packet. For example, as illustrated in FIG. 4, server optimization module 127 may request (410) the entire contents of the resource from server application 125 by issuing a corresponding HTTP GET command or by using any other type of communication protocol or application programming interface (API). Server application 125 may then send a response 412 that includes the entire contents of the resource using, for example, HTTP status code 200 ("OK"). In this example, the resource includes, at the time of the response, the word "apple."

As illustrated in FIG. 4, response 412 may also in some examples include a version tag uniquely identifying the version of the resource. The version tag may be, for example, a hash function of the resource's contents, the resource's timestamp, or any other parameters. In some examples, if server optimization module 127 communicates with server application 125 via HTTP, the version tag may be passed as an HTTP entity tag or "etag." In the example of FIG. 4, response 412 includes an etag identifying the last version of the resource, symbolically represented as "v1." Module 127 may then store the etag, for example, in database 129 or in another database or memory.

As will be illustrated below, by keeping track of version tags, server application 125 and server optimization module 127 may avoid transferring the same version of the resource in the future, thereby reducing the load on server application 125. It will be also illustrated below how such version tracking technique can be used to reduce response latency and bandwidth in communications between client optimization module 117 and server optimization module 117, and between server optimization module 127 and database 129. It is appreciated, however, that in other examples, other latency and bandwidth reduction techniques may be used, and in yet other examples, no latency or bandwidth reduction techniques may be used.

After obtaining the resource, server optimization module 127 may create and store (414) in database 129 a new packet. Because the new packet is the first packet, server optimization module 127 may include in the new packet the entire contents of the resource (in this example, "apple") representing the "differences" between the current version and the previous (non-existent) version of the resource. In some examples, server optimization module 127 may also store a version tag ("x1") identifying the latest version of the new packet. In addition to creating and storing the new packet, module 127 may create the packet list if no packet list existed in database 129, and update (416) the packet list to include an identifier of the new packet, such as its universal resource identifier (URI) (in this example, "/pack/1"). In some examples, server optimization module 127 may also store a version tag ("y1") identifying the latest version of the packet list.

After updating the packet list, server optimization server 127 may send (420) the updated packet list, along with its version tag ("y1"), to computing device 110. The updated packet list may be intercepted by client optimization module 117. Upon obtaining the packet list, client optimization module 117 may send to computing device 120 packet requests for each packet identified in the packet list. In this example, client optimization module 117 sends a single packet request 422 corresponding to the first (and at this point the only) packet in the packet list.

When packet request 422 is received by server optimization module 127, module 127 determines whether the resource has changed since the packet list and the packets have last been updated. In the example of FIG. 4, module 127 sends (428) to server application 125 an HTTP GET command requesting the resource, where the command includes an "it-none-match" header indicating the last version of the resource obtained by module 127 ("v1"). Including the "if-none-match" header causes server application 125 to send the resource to module 127 if the resource has been updated, i.e., if it has a version different than "v1", and not to send the resource if it has not been updated. In the example of FIG. 4, server application 125 determines that the resource has not been updated, and therefore it sends (430) to module 127 HTTP status code 304 ("Not Modified") without sending the contents of the resource.

After determining that the resource has not changed, server optimization module 127 requests (432) the first packet from database 129, and obtains (434) the first packet, along with a version tag ("x1") indicating the first packet's current version. Server optimization module 127 then sends (436) the first packet along with the version tag to computing device 110, and the communication is intercepted by client optimization module 117. Client optimization module 117 then reconstructs the resource's contents by applying the differences described in the first packet ({+apple}) to the resource's previous version (null), and thus determines the resource's current contents are {apple}. Client optimization module 117 then transfers (438) the contents of the resource to client application 115.

Figure 5:
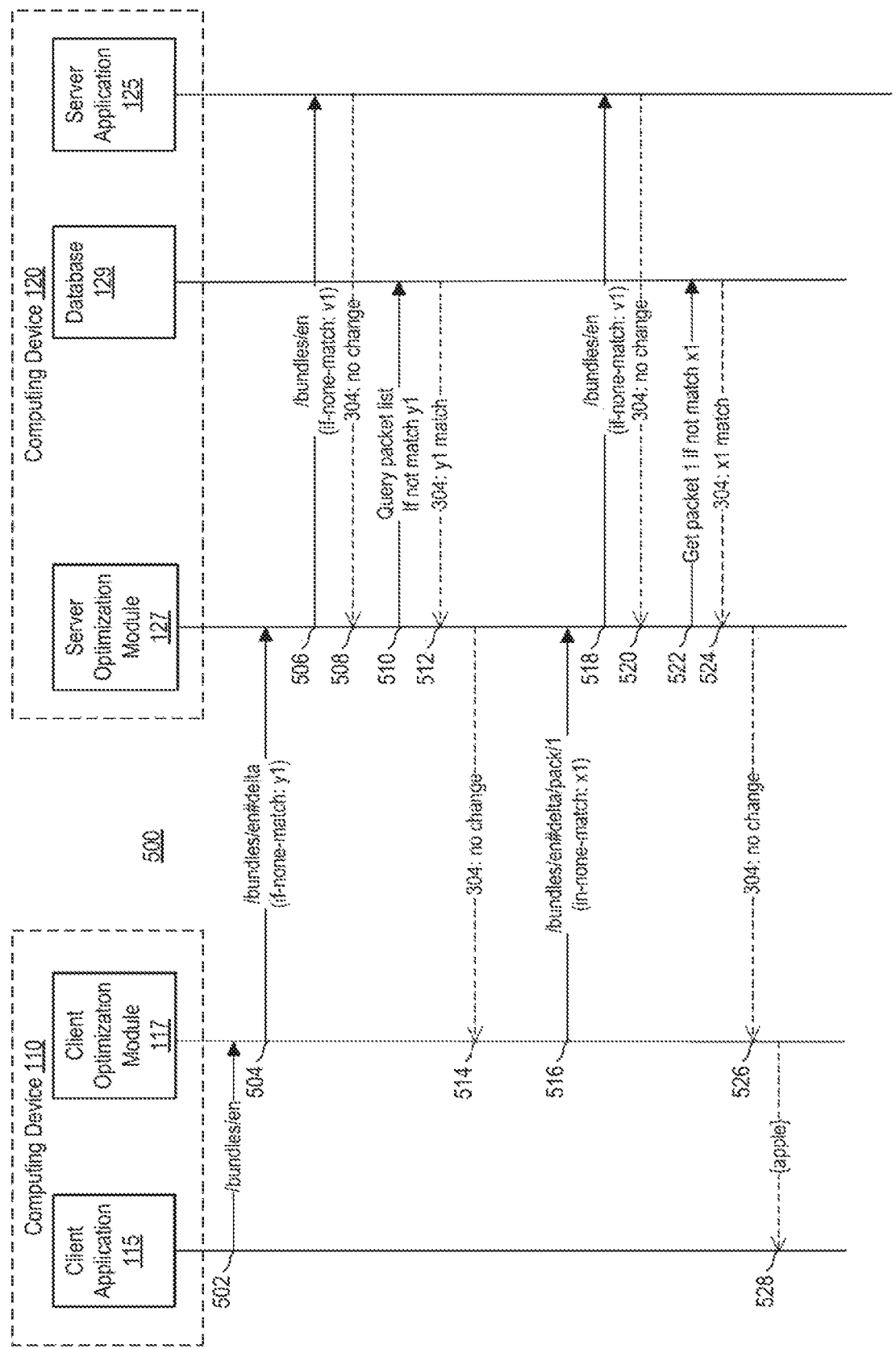
FIG. 5 illustrates another example sequence of communications.

FIG. 5 illustrates an example sequence 500, which may follow example sequence 400. In example sequence 500, client application 115 again issues a resource request 502 requesting the same resource "bundles/en." Client optimization module 117 intercepts resource request 502 and sends to computing device 120 a modified resource request 504. In this example, modified resource request 504 includes, in addition to the predefined fragment identifier "#delta" discussed above, an "if-none-match: y1" header, indicating that the last packet list received by module 117 had a version "y1" and that computing device 120 need not send the packet list again if its version has not changed.

After intercepting modified resource request 504, server optimization module 127 queries (506) server application 125 as to whether the resource has changed since it was last delivered to server optimization module 127, i.e., whether the resource's current version is different than "v1." In this example, server application 125 determines that the resource has not been updated, and sends (508) to module 127 HTTP status code 304 ("Not Modified"). In some examples, to improve performance, module 127 may not perform this verification every time it obtains a resource request from computing device 110. For example, module 127 may not perform the verification until a predefined period of time has passed since the last verification.

After determining that the resource hasn't changed since it was last received by module 127, module 127 determines whether the packet list has been updated since it was last sent to computing device 110. In this example, module 127 requests (510) that database 129 provide the packet list if its version is different than "y1" and receives a response (512) that the version has not changed. Accordingly, module 127 sends (514) to computing device 110 an HTTP status code 304 ("Not Modified") indicating that the packet list has not changed. Module 127 may communicate with database using any suitable communication protocol or application programmable interface (API) such as HTTP, SQL, etc.

After intercepting communication 514 and determining that the packet list has not changed since it was last obtained, client optimization module 117 sends to computing device 120 a packet request 516 requesting the first packet in the list, because while the packet list has not changed, the packet itself could have changed. In this example, packet request 516 also includes a header "if-none-match: x1" indicating that the requester already has the first packet having version "x1."

Server optimization module intercepts packet request 516; determines based on communications (518 and 520) with server application 125 that the resource has not changed since its last version ("v1"); and determines based on communications (522 and 524) with database 129 that the first packet has not changed and still has a version "x1." Accordingly, server optimization module responds (526) to computing device 110 that the first packet has not changed. Client optimization module 117 intercepts the communication, determines that since the only packet in the packet list has not changed, the contents of the resource also have not changed, and therefore client optimization module 117 sends (528) the previously determined contents of the resource ({apple}).

Figure 6:
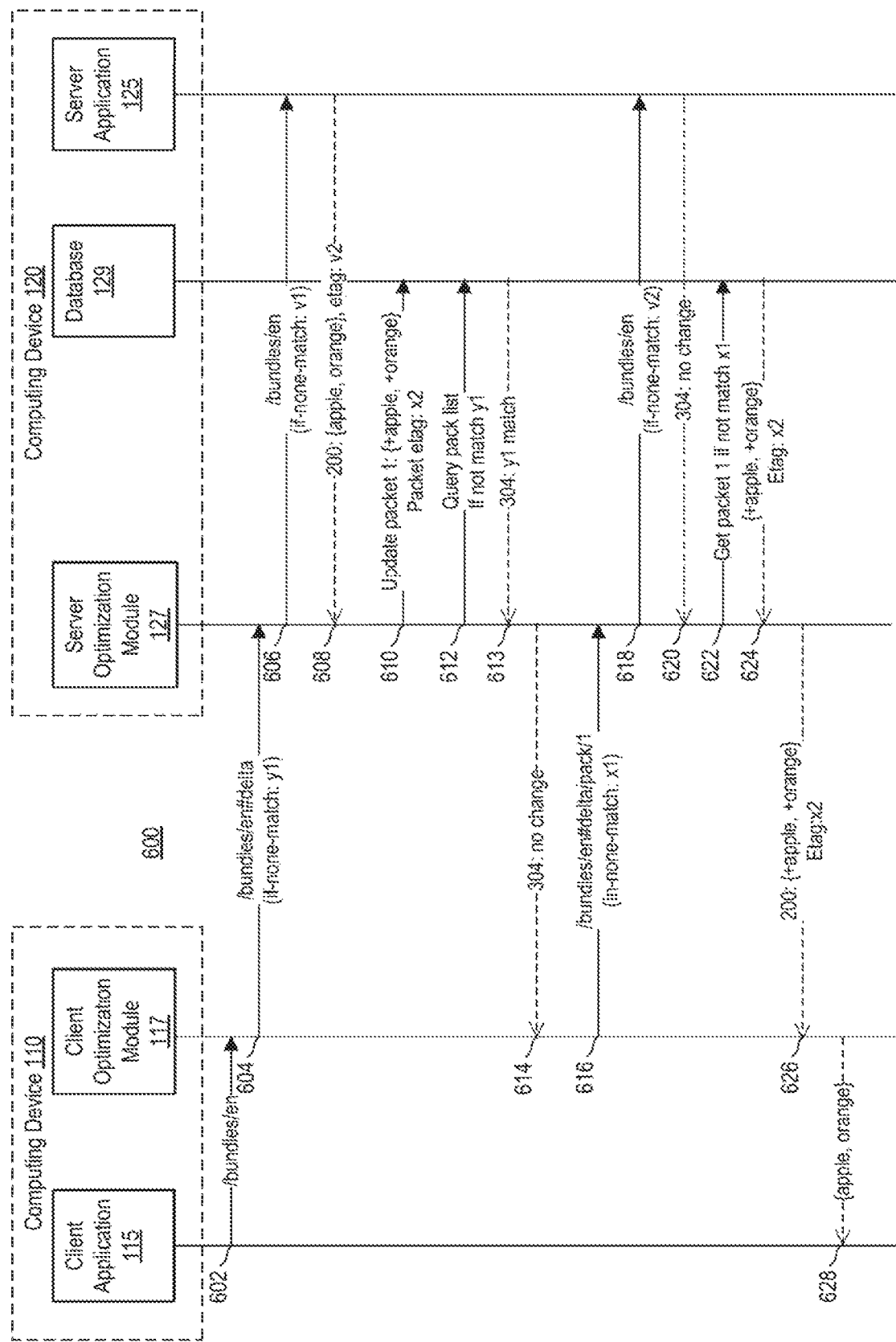
FIG. 6 illustrates another example sequence of communications.

FIG. 6 illustrates an example sequence 600, which may follow example sequence 500. In example sequence 600, client application 115 again issues a resource request 602 requesting the same resource "bundles/en." Client optimization module 117 intercepts resource request 602 and sends to computing device 120 a modified resource request 604, which again includes the predefined fragment identifier "#delta" and the "if-none-match: y1" header, as discussed above.

After intercepting modified resource request 604, server optimization module 127 queries (606) server application 125 as to whether the resource has changed since it was last delivered to server optimization module 127, i.e., whether the resource's current version is different than "v1." In this example, server application 125 determines that the resource has been updated and that its current contents are {apple, orange}. Accordingly, server application 125 sends (608) the resource's contents to server optimization module 127, along with a new version tag "v2."

Upon a determination that the resource has been updated, server optimization module 127 may update the packet list and/or some packet(s) in the packet list to correspond to the updated resource. In the example of FIG. 6, module 127 updates (610) the first packet to include the entire contents of the updated resource ({apple, orange}). Module 127 also determine, based on communications 612 and 613, that the packet list has not been updated and is still at version "y1." Because in this example module 127 does not add or remove packets from the packet list, module 127 does not update the packet list.

Next, server optimization module 127 sends to computing device 110 a communication 614 indicating that the packet list has not changed. Client optimization module 117 intercepts this communication, and issues a packet request 616 to computing device 120 requesting the first packet, and specifying the latest version of the packet it has received ("x1"). After intercepting packet request 616, server optimization module 127 determines, using communications 618 and 620, that the resource's version has not changed and is still at "v2." Module 127 then requests (622) from database 129 to provide the first packet if its version has changed from "x1." Since the version of the packet has changed to "x2", database 129 sends (624) the updated first packet to module 127, along with its latest version tag "x2." Server optimization module 127 then sends (626) the updated first packet along with its latest version tag to computing device 110. Client optimization module 117 intercepts this communication, and based on earlier determinations that the packet list contained only one packet (and that the packet list has not been updated since), module 117 determines that the contents of the resource are all contained in the first packet. Accordingly, module 117 sends (628) the contents {apple, orange} to client application 115.

Figure 7:
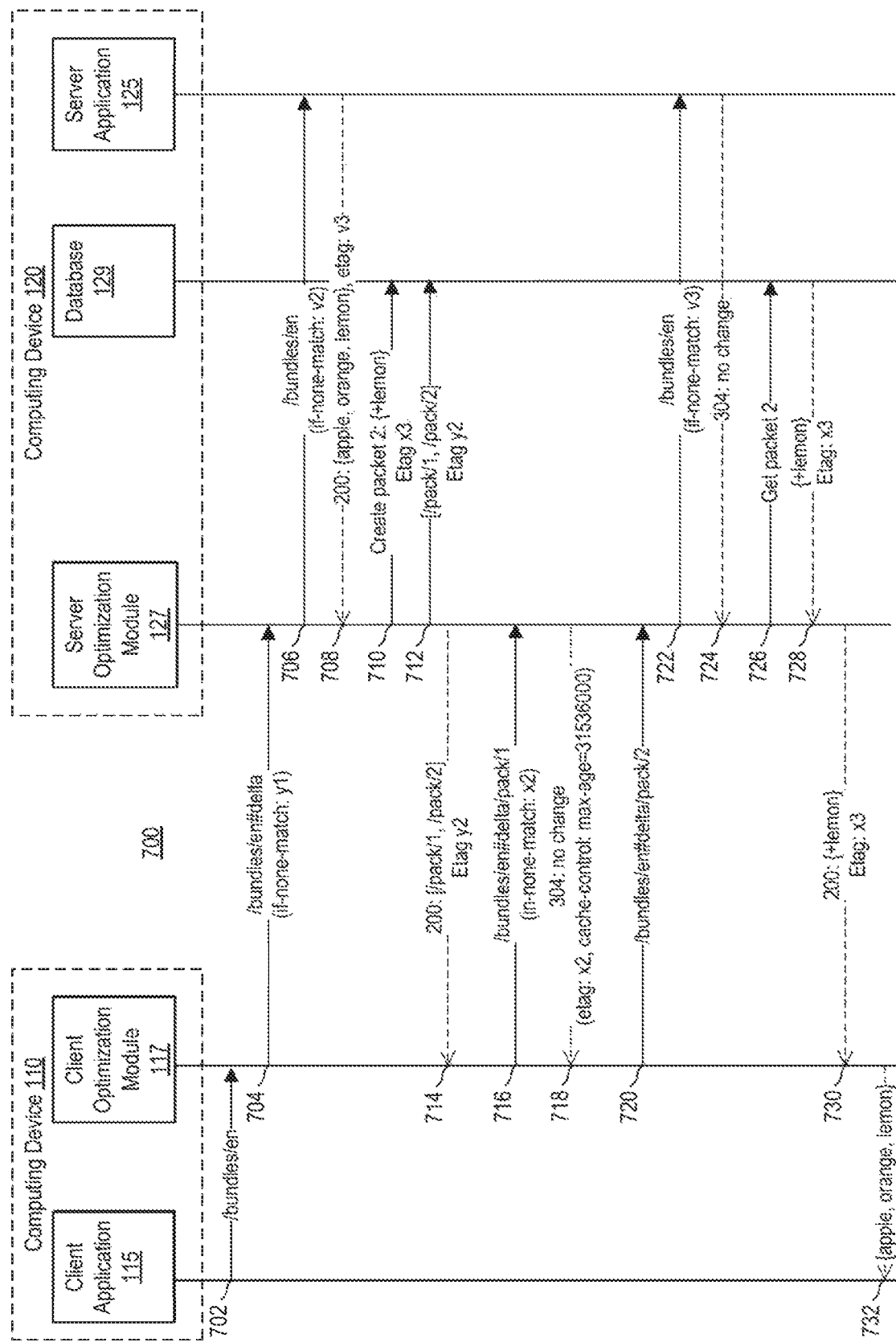
FIG. 7 illustrates another example sequence of communications.

FIG. 7 illustrates an example sequence 700, which may follow example sequence 600. In example sequence 700, client application 115 again requests (702) resource "/bundles/en"; client optimization module 117 modifies the request and sends (704) the modified request to computing device 120, where the request is intercepted by server optimization module 127.

In this example, when server optimization module 127 inquires (706) server application 125 for the resource, it receives (708) updated resource contents ({apple, orange, lemon}) along with the updated resource's version tag "v3." Thus, module 127 determines that the resource has changed again. This time, module 127 decides not to update the first packet. Instead, module 127 decides to create (open) a second packet that would include the differences between the first packet and the updated version of the resource. Accordingly, module 127 creates and stores (710) in database 129 a second packet having the contents of {+lemon} indicating that the word "lemon" is added to the resource contents. After creating the second packet, module 127 updates (712) the packet list in database 129 to include the first and second packets.

Next, module 127 sends (714) the updated packet list along with its version tag "y2" to computing device 110. Upon intercepting the updated packet list that includes two packets, client optimization module 117 first requests (716) from computing device 120 the first packet, and indicates that the last version of the first packet it has received is "x2."

In some examples, server optimization module 127 may designate a particular packet as a "closed" packet that will not be updated in the future. In some examples, module 127 may determine all packets but the last one as 'closed' packets. In the example of FIG. 7, after creating a second packet and updating the packet list, module 127 determines that the first packet is a closed packet. Having determined that the first packet is a closed packet, in some examples, module 127 may not need to access database 129 to determine whether the first packet has changed. In other examples, module 127 may nevertheless access database, e.g., at least to determine whether or not the first packet is a closed one.

After receiving the request for the first packet, module 127 in the example of FIG. 7 sends to computing device 110 a response 718 indicating that the first packet has not changed since version "x2". Furthermore, because the first packet has been designated as a closed packet, response 718 also indicates that the first packet will not change at least for a predefined period of time. In the example of FIG. 7, response 718 indicates this by including HTTP header "cache-control" with a parameter of "max-age" set to the maximum possible value of 31536000 seconds corresponding to the period of time of one year. In some examples, when client optimization module 117 receives a closed packet, i.e., a packet with an indication that the packet will not expire at least for a certain period of time, module 117 may save that packet in cache 113, allowing module 117 to later (e.g., at least during the specified period of time) obtain the packet from cache 113 instead of computing device 120.

After receiving response 718, client optimization module 117 sends (720) to computing device 120 a request for the second packet. Server optimization module 127 intercepts this request, determines based on communications 722 and 724 with server application 125 that the resource has not been updated, obtains (726 and 728) the second packet from database 129, and sends (730) the second packet to computing device 110. Client optimization module 117 intercepts this communication and reconstructs the contents of the resource based on the obtained first and second packets. That is, client optimization module 117 first applies the differences described in the first packet ({+apple, +orange}) to the null version and obtains the first resource version of (apple, orange). Module 117 then applies the differences described in the second packet ({+lemon}) to the first resource version of (apple, orange) and obtains the second (and latest) version of the resource: {apple, orange, lemon}. Module 117 then sends (732) the reconstructed resource contents to client application 115.

Figure 8:
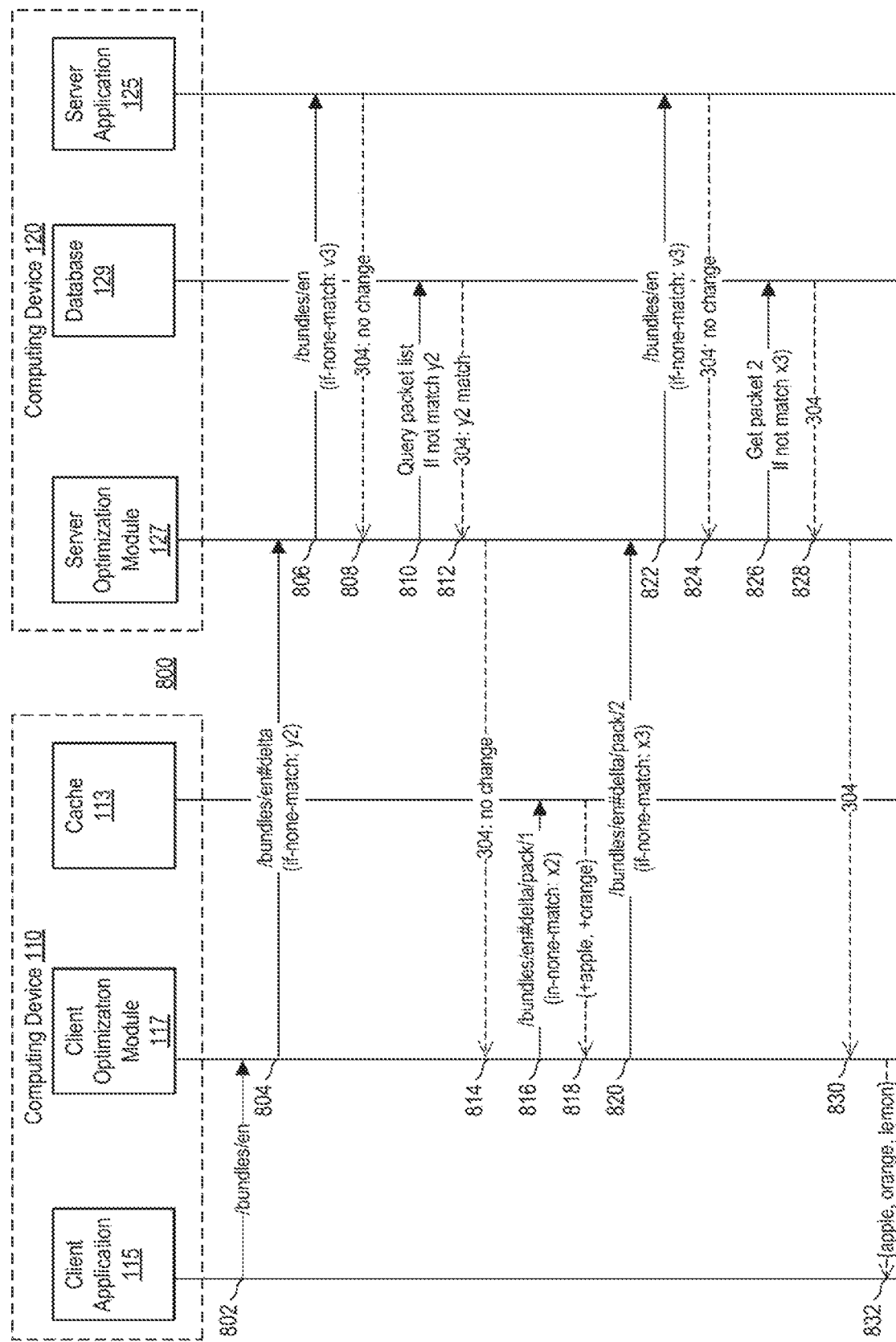
FIG. 8 illustrates another example sequence of communications.

FIG. 8 illustrates an example sequence 800, which may follow example sequence 700. In example sequence 800, client application 115 again requests (802) resource "/bundles/en"; client optimization module 117 modifies the request and sends (804) the modified request to computing device 120, where the request is intercepted by server optimization module 127. Module 127 then determines, based on communications 806 and 808 with server application 125 that the resource has not changed since it was last obtained by module 127. Module 127 further determines, based on communications 810 and 812 with database 129 that the packet list also has not changed since it was last obtained by module 127. Accordingly, module 127 sends (814) to computing device 110 an indication that the packet list has not changed.

The communication is intercepted by client optimization module 117. Module 117 then obtains the first packet. In some examples, before obtaining any packet, module 117 may first check whether that packet is stored (and is "fresh") in cache 113. In this example, because the first packet was "closed" by module 127, it was stored by module 117 in cache 113, as discussed above. Accordingly, in this example, when module 117 queries (816) cache 113 for the first packet, it receives (818) the first packet from cache 113, thereby increasing the response time and reducing the load on network 130 and computing device 120.

Next, module 117 requests (820) the second packet from computing device 120. Module 127 intercepts this request: determines based on communications 822 and 824 with server application 125 that the resource has not changed since it was last obtained by module 127; determines based on communications 826 and 826 with database 129 that the second packet has not changed since it was last obtained by module 127; and sends (830) to computing device 110 an indication that the second packet has not changed since it was last obtained by computing device 110. This communication is intercepted by module 117, which reconstructs the resource based on the two packets (as described above) and sends (832) the reconstructed resource to client application 115.

In some examples, server optimization module 127 may determine that the packet list for a given resource is too long (e.g., longer than a predefined number of packets) and can be shortened in order to decrease the overall response time and also reduce the load on the various modules (e.g., 127, 125, and 117) and network 130. In such a case, server optimization module 127 may repack the packet list to generate a shorter packet list that still accurately represents the resource.

In some examples, module 127 may fully repack the packet list, discarding all existing packets and generating some new packet(s) representing the entire contents of the resource. For example, a packet list containing packets 1, 2, 3, 4, may be replaced by a packet list containing packets 5, 6. e.g., where new packet 5 combines (i.e., summarizes) the differences previously described in packets 1, 2, and 3, and new packet 6 describes differences previously described in packet 4.

In other examples, module 127 may partially repack the packet list, e.g., by combining sets of two or more packets into single packets. For example, a packet list containing packets 1, 2, 3, 4, 5 may be replaced by a packet list containing packets 1, 6, 4, 5, where packet 6 describes the combined differences previously described in packets 2 and 3. Furthermore, in some examples, module 127 may continuously (e.g., periodically) partially repack the packet list. Thus, for example, packet list containing packets 1, 6, 4, 5 may be further repacked into a packet list containing packets 1, 7, 5, where packet 7 describes the combined differences previously described in packets 6 and 4. In some examples, module 127 may decide which packets to combine into a single packet based on the size of the packets (where smaller packets are more likely to be combined), based on whether the packets are closed or open (where closed packets are more likely to be combined), or other factors.

In some examples, module 127 may maintain more than one packet list for a given resource. This may allow module 127 to use one packet list for certain computing devices 110 and another packet list for other computing devices 110. For example, after repacking a first packet list into a second (e.g., shorter) packet list, in order to avoid a sudden bandwidth increase, module 127 may continue maintaining the first packet list and using it with computing devices 110 that have already obtained the first packet list, and start using the second packet list with "new" computing devices 110 that have not obtained the first packet list. Module 127 may determine whether or not a particular computing device 110 has obtained the first packet list, for example, based on whether the resource request received from that computing device 110 includes the "if-none-match" header and/or based on the version tag included in that header.

In the foregoing discussion, various modules (e.g., 115, 117, 125, 127, etc.) were described as any combinations of hardware and instructions (e.g., programming). Such components may be implemented in a number of fashions. The instructions may include processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 9:
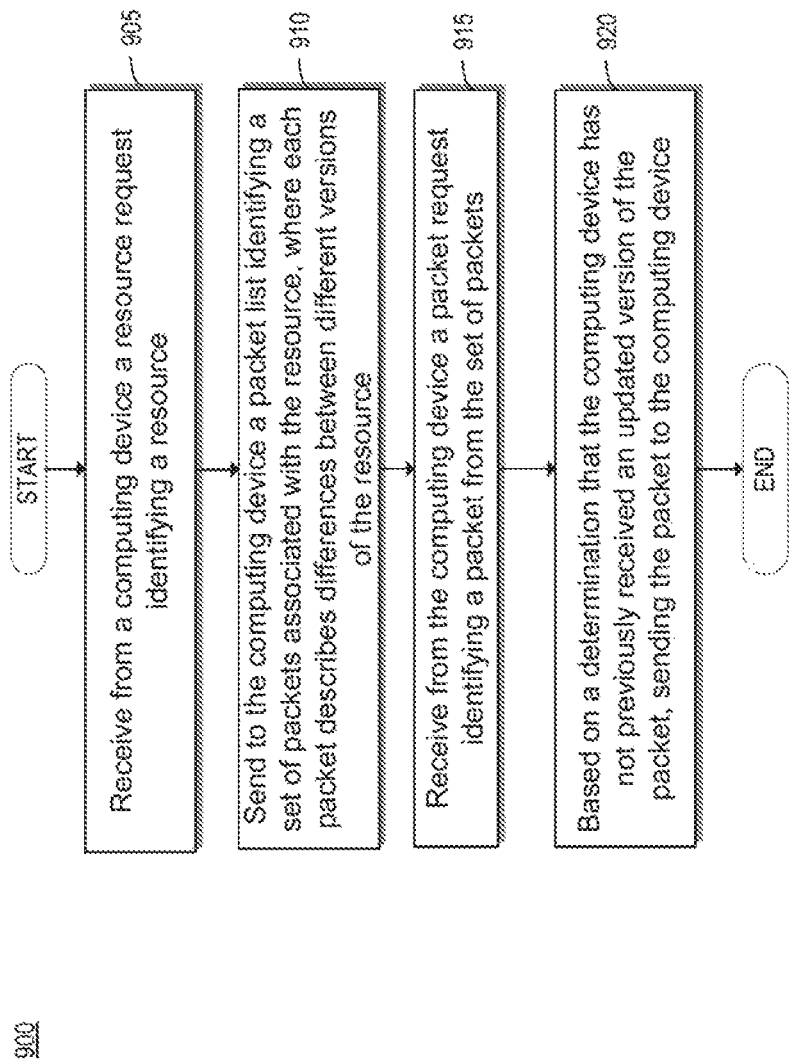
FIG. 9 shows a flowchart of an example method.

FIG. 9 is a flowchart of an example method 900. Method 900 may be described below as being executed or performed by a system or by a computing device such as computing device 120 of FIGS. 1-8. Other suitable systems and/or computing devices may be used as well. Method 900 may be implemented in the form of executable instructions stored on at least one non-transitory machine-readable storage medium of the system and executed by at least one processor of the system. Method 900 may also be implemented in the form of electronic circuitry (e.g., hardware). In other examples of the present disclosure, some blocks of method 900 may be executed substantially concurrently or in a different order than shown in FIG. 9. In yet other examples of the present disclosure, method 900 may include more or less blocks than are shown in FIG. 9. In some examples, some of the blocks of method 900 may, at certain times, be ongoing and/or may repeat.

At block 905, method 900 may receive from a computing device (e.g., 110) a resource request identifying a resource. At block 910, method 900 may send to the computing device a packet list identifying a set of packets associated with the resource, where each packet describes differences between different versions of the resource. At block 915, method 900 may receive from the computing device a packet request identifying a packet from the list of packets. At block 920, method 900 may, based on a determination that the computing device has not previously received a most updated version of the packet, send the packet to the computing device. As discussed above, in some examples, the method may include fewer blocks or additional blocks not shown in FIG. 5 for brevity.

Figure 10:
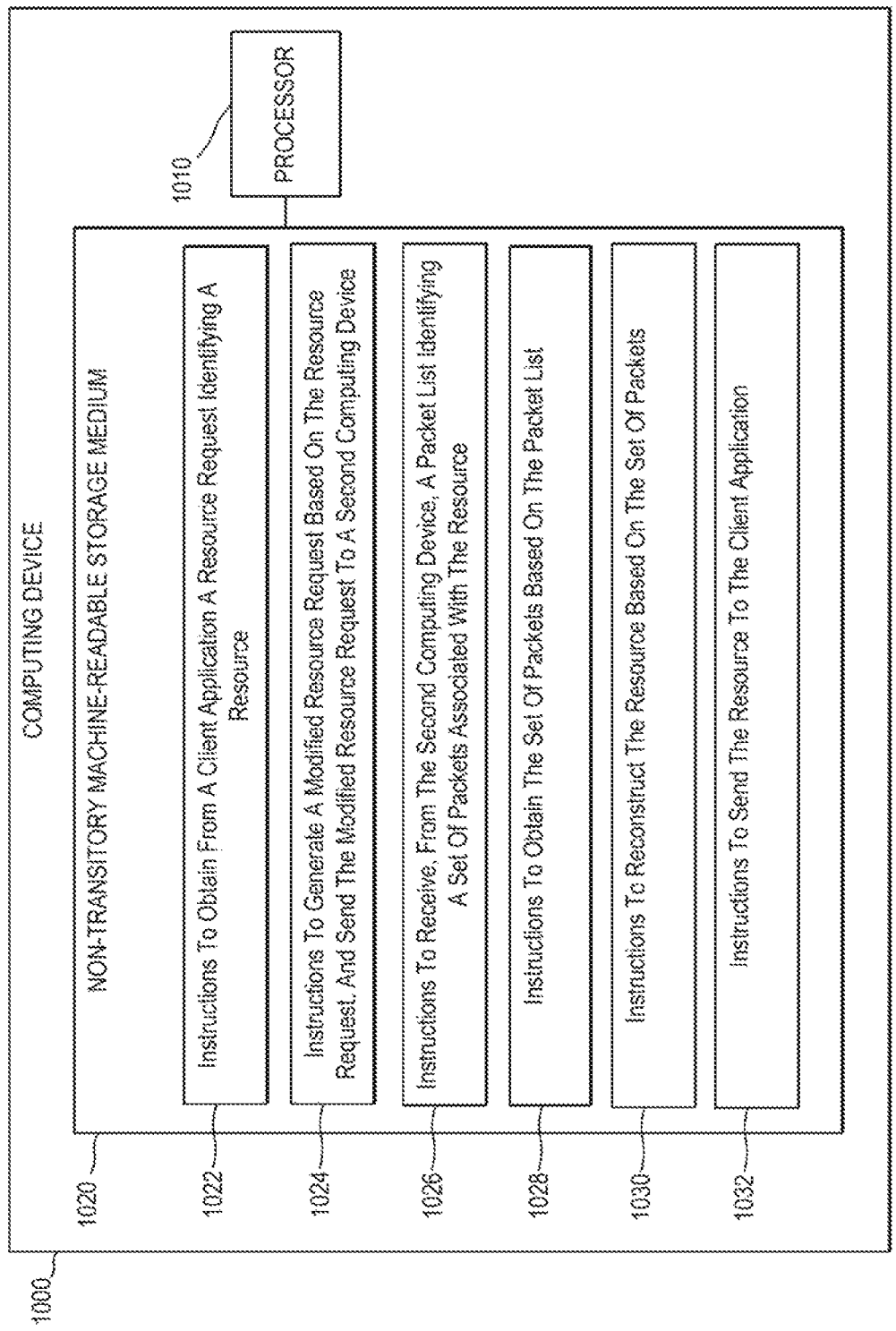
FIG. 10 is a block diagram of an example computing device.

FIG. 10 is a block diagram of an example computing system 1000. Computing device 1000 may be similar to computing device 110 of FIG. 1. In the example of FIG. 10, computing device 1000 includes a processor 1010 and a non-transitory machine-readable storage medium 1020. Although the following descriptions refer to a single processor and a single machine-readable storage medium, multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 1010 may include any number of central processing units (CPUs), microprocessors, and/or other hardware devices suitable for retrieval and execution of instructions stored in non-transitory machine-readable storage medium 1020. In the particular example shown in FIG. 10, processor 1010 may fetch, decode, and execute instructions 1022, 1024, 1026, 1028, 1030, 1032, or any other instructions (not shown for brevity). Processor 1010 may include any number of electronic circuits comprising a number of electronic components for performing the functionality of some of the instructions in machine-readable storage medium 1020. With respect to the executable instruction representations (e.g., boxes) described and shown herein, it should be understood that part or all of the executable instructions and/or electronic circuits included within one box may, in other examples, be included in a different box shown in the figures or in a different box not shown.

Non-transitory machine-readable storage medium 1020 may be any electronic, magnetic, optical, or other physical storage device that stores executable instructions. Thus, medium 1020 may be, for example, Random Access Memory (RAM), an Electrically-Erasable Programmable Read-Only Memory (EEPROM), a storage drive, an optical disc, and the like. Medium 1020 may be disposed within computing device 1000, as shown in FIG. 10. In this situation, the executable instructions may be "installed" on computing device 1000. Medium 1020 may be a portable, external or remote storage medium, for example, that allows computing device 1000 to download the instructions from the portable/external/remote storage medium. In this situation, the executable instructions may be part of an "installation package". As described herein, medium 1020 may be encoded with executable instructions.

Referring to FIG. 10, instructions 1022, when executed by a processor (e.g., 1010), may cause a computing device (e.g., 1000) to obtain from a client application a resource request identifying a resource. Instructions 1024, when executed by the processor, may cause the computing device to generate a modified resource request based on the resource request, and send the modified resource request to a second computing device. Instructions 1026, when executed by the processor, may cause the computing device to receive, from the second computing device, a packet list identifying a set of packets associated with the resource, wherein each packet describes differences between different versions of the resource. Instructions 1028, when executed by the processor, may cause the computing device to obtain the set of packets. Instructions 1030, when executed by the processor, may cause the computing device to reconstruct the resource based on the set of packets. Instructions 1032, when executed by the processor may cause the computing device to send the resource to the client application.

The invention claimed is:

1. A method comprising:

receiving, by a first computing device from a second computing device, a resource request identifying a resource;

sending, by the first computing device to the second computing device, a packet list identifying a set of packets associated with the resource, wherein each packet of the set of packets describes differences between different versions of the resource, where a first packet of the set of packets is associated with a first version of the resource, and a second packet of the set of packets is associated with a second version of the resource and describes a difference between the second version of the resource and the first version of the resource associated with the first packet;

receiving, by the first computing device from the second computing device, a packet request identifying a given packet from the set of packets; and based on a determination that the second computing device has not previously received an updated version of the given packet, sending, by the first computing device, the given packet to the second computing device.

2. The method of claim 1, further comprising:

based on a determination that the resource has been modified, performing at least one of:
updating at least one packet in the set of packets, or
adding a new packet to the set of packets, and updating the packet list to include the new packet.

3. The method of claim 1, further comprising:

based on a determination that the given packet will not be updated, sending, by the first computing device to the second computing device, information of a non-expiration period associated with the given packet, the non-expiration period being a period during which the given packet will not change.

4. The method of claim 1, further comprising:

creating, by the first computing device, a new packet, wherein the new packet combines differences described in at least two packets from the set of packets; and
replacing, by the first computing device, the at least two packets with the new packet in the packet list.

5. The method of claim 1, further comprising:

based on a determination that the second computing device has previously received the updated version of the given packet, sending, by the first computing device to the second computing device, a communication indicating that the given packet has not changed.

6. The method of claim 1, wherein the sending of the packet list is performed in response to a determination, by the first computing device based on the resource request, that the second computing device supports packet-based download of the resource in which a changed portion of the resource is downloaded instead of an entirety of the resource.

7. The method of claim 1, wherein the packet request comprises a first version tag identifying a first version of the given packet previously received by the second computing device, and wherein the method further comprises sending, by the first computing device to the second computing device, a second version tag identifying the updated version of the given packet.

8. The method of claim 1, wherein the first packet describes a difference between the first version of the resource and a null version of the resource.

9. The method of claim 1, wherein a third packet of the set of packets is associated with a third version of the resource and describes a difference between the third version of the resource and the second version of the resource associated with the second packet.

10. The method of claim 9, wherein the second packet describes first content added to the first version of the resource to form the second version of the resource, and the third packet describes second content added to the second version of the resource to form the third version of the resource.

11. A first computing device comprising:
a processor; and
a server optimization module executable on the processor to:
receive, from a second computing device, a resource request identifying a resource;
send, to the second computing device in response to the resource request, a packet list identifying a set of packets associated with the resource, wherein each packet of the set of packets describes differences between different versions of the resource, where a first packet of the set of packets is associated with a first version of the resource, and a second packet of the set of packets is associated with a second version of the resource and describes a difference between the second version of the resource and the first version of the resource associated with the first packet;
receive, from the second computing device, a packet request identifying a given packet from the set of packets;
determine whether the given packet has been updated; and
based on a determination that the given packet has been updated, send the given packet to the second computing device in response to the packet request.

12. The first computing device of claim 11, wherein the server optimization module is executable on the processor to:
determine, based on a communication with a server application at the first computing device, that the resource has been updated;
based on the determination that the resource has been updated, produce an updated packet list; and
send the updated packet list to the second computing device.

13. The first computing device of claim 11, wherein the server optimization module is executable on the processor to:
for at least one packet in the set of packets, send to the second computing device an indicator that the at least one packet will not be updated within a predefined period of time.

14. The first computing device of claim 11, wherein the resource request comprises an indication that the second computing device supports packet-based download of the resource in which a changed portion of the resource is downloaded instead of an entirety of the resource, and wherein the server optimization module is executable on the processor to send the packet list to the second computing device in response to the indication.

15. The first computing device of claim 11, wherein the server optimization module is executable on the processor to:
based on a determination that the given packet has not been updated, send, to the second computing device in response to the packet request, a response indicating that the given packet has not been updated.

16. The first computing device of claim 11, wherein the first packet describes a difference between the first version of the resource and a null version of the resource, and wherein a third packet of the set of packets is associated with a third version of the resource and describes a difference between the third version of the resource and the second version of the resource associated with the second packet.

17. A non-transitory machine-readable storage medium comprising instructions that upon execution cause a first computing device to:
receive, from a client application, a resource request identifying a resource;
generate a modified resource request based on the resource request, and send the modified resource request to a second computing device;
receive, from the second computing device, a packet list identifying a set of packets associated with the resource, wherein each packet of the set of packets describes differences between different versions of the resource, where a first packet of the set of packets is associated with a first version of the resource, and a second packet of the set of packets is associated with a second version of the resource and describes a difference between the second version of the resource and the first version of the resource associated with the first packet;
based on the packet list, obtain the set of packets comprising a given packet, wherein the obtaining of the set of packets comprises obtaining a version of the given packet that has been updated from a previous version of the given packet;
reconstruct the resource based on the set of packets; and
send the resource to the client application.

18. The non-transitory machine-readable storage medium of claim 17, wherein the obtaining of the set of packets comprises, for each respective packet in the set of packets:
determining whether the respective packet is stored in a cache communicatively coupled to the first computing device;
based on a determination that the respective packet is stored in the cache, obtaining the respective packet from the cache; and
based on a determination that the respective packet is not stored in the cache, sending, to the second computing device, a packet request identifying the respective packet, and receiving the respective packet from the second computing device.

19. The non-transitory machine-readable storage medium of claim 17, wherein the obtaining of the set of packets comprises, for a further packet in the set of packets:
determining whether a first version of the further packet is stored in a memory of the first computing device;
based on a determination that the first version of the further packet is stored in the memory of the first computing device, sending, to the second computing device, a packet request identifying the further packet and including a tag identifying the first version of the further packet; and
obtaining a response from the second computing device, wherein the response comprises one of:
a second version of the further packet; or
an indication that the first version of the further packet is a latest version.

20. The non-transitory machine-readable storage medium of claim 17, wherein the reconstructing of the resource comprises recursively applying a difference described in each respective packet in the set of packets to combine differences described in packets preceding the respective packet.

* * * * *